(12) United States Patent
Cui et al.

(10) Patent No.: US 11,998,779 B2
(45) Date of Patent: Jun. 4, 2024

(54) MAIN VALVE FOR DRAWING STRAIGHTWAY DELUGE VALVE

(71) Applicant: NINGJIN APC INDUSTRIES CO., LTD, Shandong (CN)

(72) Inventors: Shusheng Cui, Shandong (CN); Liyong Zhang, Shandong (CN); Hongchang Liu, Shandong (CN)

(73) Assignee: Shandong Meihua Fire Technology Co., Ltd., Shandong (CN)

( * ) Notice: Subject to any disclaimer, the term of this patent is extended or adjusted under 35 U.S.C. 154(b) by 694 days.

(21) Appl. No.: 17/272,408

(22) PCT Filed: Nov. 25, 2019

(86) PCT No.: PCT/CN2019/120631
§ 371 (c)(1),
(2) Date: Mar. 1, 2021

(87) PCT Pub. No.: WO2021/102631
PCT Pub. Date: Jun. 3, 2021

(65) Prior Publication Data
US 2022/0062677 A1 Mar. 3, 2022

(51) Int. Cl.
*F16K 31/52* (2006.01)
*A62C 35/68* (2006.01)
(Continued)

(52) U.S. Cl.
CPC ............ *A62C 35/68* (2013.01); *F16K 1/2007* (2013.01); *F16K 27/0227* (2013.01);
(Continued)

(58) Field of Classification Search
CPC ............... F16K 1/2007; F16K 27/0227; F16K 31/1655; F16K 31/521; F16K 31/563; F16K 31/122; A62C 35/68
(Continued)

(56) References Cited

U.S. PATENT DOCUMENTS 1,165,386 A * 12/1915 Brainard .............. A62C 35/645
169/21
2,356,990 A * 8/1944 Getz .................... A62C 35/645
251/177
(Continued)

FOREIGN PATENT DOCUMENTS

CN 2568900 8/2003
CN 2674230 1/2005
(Continued)

OTHER PUBLICATIONS

International Search Report of Aug. 24, 2020.

*Primary Examiner* — Craig J Price
(74) *Attorney, Agent, or Firm* — Gerald E. Hespos; Michael J Porco

(57) ABSTRACT

A main valve for a straightway deluge valve includes a valve body (1), a valve cover (2), a diaphragm (3), a drawing piston (4), a diaphragm pressure plate (5), a drawing link (6), a valve body link (7), a valve plate link (8), a rotatable lip and a mounting hole cover (13). A piston guide is provided at a side part of the valve body (1). The drawing piston (4) is provided slidably in the piston guide along a left-right direction. When the drawing piston (4) slides along the piston guide, the rotatable lip can contact with or separate from the inner sealing end surface. The main valve for drawing the straightway deluge valve, after the valve plate (9) is opened, enables the flow passage to be close to a straightway passage, thereby reducing flow loss.

8 Claims, 2 Drawing Sheets

(51) Int. Cl.
  *F16K 1/20* (2006.01)
  *F16K 27/02* (2006.01)
  *F16K 31/165* (2006.01)
  *F16K 31/56* (2006.01)
(52) U.S. Cl.
  CPC ........ *F16K 31/1655* (2013.01); *F16K 31/521* (2013.01); *F16K 31/563* (2013.01)
(58) Field of Classification Search
  USPC .......... 169/17, 20–22; 251/232, 212, 50–52; 137/516.9, 514, 514.7, 527.4, 856, 527, 137/527.2, 527.6, 527.8, 45, 4.6, 463, 137/488–492.5
  See application file for complete search history.

(56) References Cited

U.S. PATENT DOCUMENTS

| | | | | |
|---|---|---|---|---|
| 2,373,001 | A * | 4/1945 | Allen | F16K 27/08 251/232 |
| 2,472,008 | A | 5/1949 | Freeman | |
| 2,591,959 | A * | 4/1952 | Mcrae | F16K 1/2007 137/75 |
| 2,893,414 | A * | 7/1959 | Snyder | E03C 1/108 137/489 |
| 3,254,660 | A * | 6/1966 | Ray | F16K 31/105 137/553 |
| 3,307,633 | A * | 3/1967 | Newall | F16K 15/03 169/22 |
| 3,635,239 | A * | 1/1972 | Farrer | F16K 1/2007 137/461 |
| 3,684,237 | A * | 8/1972 | Hyde | F16K 31/163 251/232 |
| 3,942,551 | A * | 3/1976 | Schuller | F16K 15/03 137/554 |
| 4,188,973 | A * | 2/1980 | Weise | F16K 15/033 137/514.7 |
| 4,669,500 | A * | 6/1987 | Strelow | F16K 15/034 137/553 |
| 4,706,706 | A * | 11/1987 | Page | F16K 15/03 277/641 |
| 5,295,503 | A * | 3/1994 | Meyer | A62C 35/68 251/293 |
| 5,794,655 | A * | 8/1998 | Funderburk | F16K 15/035 137/527.2 |
| 6,158,520 | A * | 12/2000 | Reilly | A62C 35/68 169/17 |
| 10,201,723 | B2 * | 2/2019 | Deurloo | A62C 35/62 |
| 2017/0146133 | A1 | 5/2017 | Archibald et al. | |

FOREIGN PATENT DOCUMENTS

| CN | 2692448 | | 4/2005 |
| CN | 105065684 | | 11/2015 |
| CN | 207112051 | | 3/2018 |
| CN | 108367184 | | 8/2018 |
| CN | 116817004 A | * | 9/2023 |
| JP | 3-284270 | | 12/1991 |

* cited by examiner

MAIN VALVE FOR DRAWING STRAIGHTWAY DELUGE VALVE

TECHNICAL FIELD

The present disclosure relates to the field of valve technologies, and in particular, to a main valve for drawing a straightway deluge valve which is used for an automatic sprinkler system, has low flow loss, and is easy to manufacture and more reliable.

BACKGROUND ART

The deluge valve refers to a control valve for automatically supplying water by controlling a feed-water pipeline for fire fighting. Deluge valves on the market are mainly two types. One type is a diaphragm type, the diaphragm has an effect of pressure bearing and sealing. The diaphragm type has the disadvantages of large flow loss, high diaphragm manufacturing cost and high diaphragm manufacturing difficulty; and, a pressure in use is limited. The other type is a lever type. The disadvantages of the lever type are that it can only be vertically mounted, have many fittings and high machining cost.

SUMMARY

It is an object of some embodiments to provide a main valve for drawing a straightway deluge valve used for an automatic sprinkler system with high pressure, wherein the main valve has low cost, long service life and convenient maintenance.

In order to achieve the above object, the present disclosure provides the following solutions:

It is provided a main valve for drawing a straightway deluge valve, including a valve body, a valve cover, a diaphragm, a drawing piston, a diaphragm pressure plate, a drawing link, a valve body link, a valve plate link, a rotatable lip and a mounting hole cover. The valve body has a top and bottom communicated to each other to form a flow passage. The lower portion of the valve body is of stepped structure and has an inner sealing end surface. A piston guide is provided at a side part of the valve body. A drawing piston is provided slidably in the piston guide along a left-right direction. The valve cover is connected to the piston guide through flanges. The diaphragm pressure plate is connected fixedly to the drawing piston. A middle portion of the diaphragm is clamped between the diaphragm pressure plate and the drawing piston. An edge of the diaphragm is clamped between the valve cover and the piston guide. The side wall of the valve body and the valve cover each have a threaded through hole provided therein. Amounting hole also is provided at another side portion of the valve body. The mounting hole cover is fixed sealingly at the mounting hole. A first end of the drawing link, a first end of the valve body link and a first end of the valve plate link are connected rotatably with each other. A second end of the drawing link is connected rotatably to one side of the drawing piston away from the diaphragm. A second end of the valve body link is connected rotatably to an upper inner wall of the valve body. A second end of the valve plate link is connected rotatably to an upper portion of the rotatable lip. One end of the rotatable lip is connected rotatably to a lower inner wall of the valve body. When the drawing piston slides along the piston guide, the rotatable lip can be in contact with or separate from the inner sealing end surface.

In some embodiments, the rotatable lip includes a valve plate, a sealing adhesive plate and a valve plate pressure plate. The valve plate pressure plate is connected fixedly to the valve plate. The sealing adhesive plate is clamped between the valve plate pressure plate and the valve plate. The sealing adhesive plate is configured for sealingly contacting with or separating from the inner sealing end surface. The valve plate is connected rotatably to the lower inner wall of the valve body and the second end of the valve plate link.

In some embodiments, a first connecting portion, which protrudes upwardly, is provided in the middle of the valve plate. One end of the valve plate is provided with a second connecting portion which protrudes upwardly. The first connecting portion is connected rotatably to the second end of the valve plate link via a first pin shaft. The second connecting portion is connected rotatably to the lower inner wall of the valve body via a second pin shaft.

In some embodiments, a lower surface of the valve plate is provided with an adhesive plate recess. The sealing adhesive plate is embedded in the adhesive plate recess.

In some embodiments, a third pin shaft simultaneously passes through the first end of the drawing link, the first end of the valve body link and the first end of the valve plate link to achieve a rotational connection among them. The second end of the drawing link is connected rotatably to the one side of the drawing piston away from the diaphragm via a fourth pin shaft. The second end of the valve body link is connected rotatably to the upper inner wall of the valve body via a fifth pin shaft. The second end of the valve plate link is connected rotatably to the upper portion of the rotatable lip through a sixth pin shaft.

In some embodiments, the valve cover has a tapered inner wall. A diameter of an opening of the valve cover is greater than that of a bottom of the valve cover. A portion of the valve body opposite to the valve cover also is tapered in these embodiments.

In some embodiments, the bottom of the valve cover is provided with a pressure plate recess. The pressure plate recess is configured for receiving the diaphragm pressure plate.

In some embodiments, the threaded through hole on the valve cover is located at a center position of the bottom of the pressure plate recess.

At least some of the embodiments have the following technical effects with respect to the prior art:

The main valve for drawing the straightway deluge valve of the present disclosure, after the valve plate is opened, enables the flow passage to be close to a straightway passage, thereby reducing flow loss. Furthermore, the main valve for drawing straightway deluge valve has a relatively simple structure, low cost, long service life and convenient maintenance, which can be used in an automatic sprinkler system with high pressure.

Figure 1:
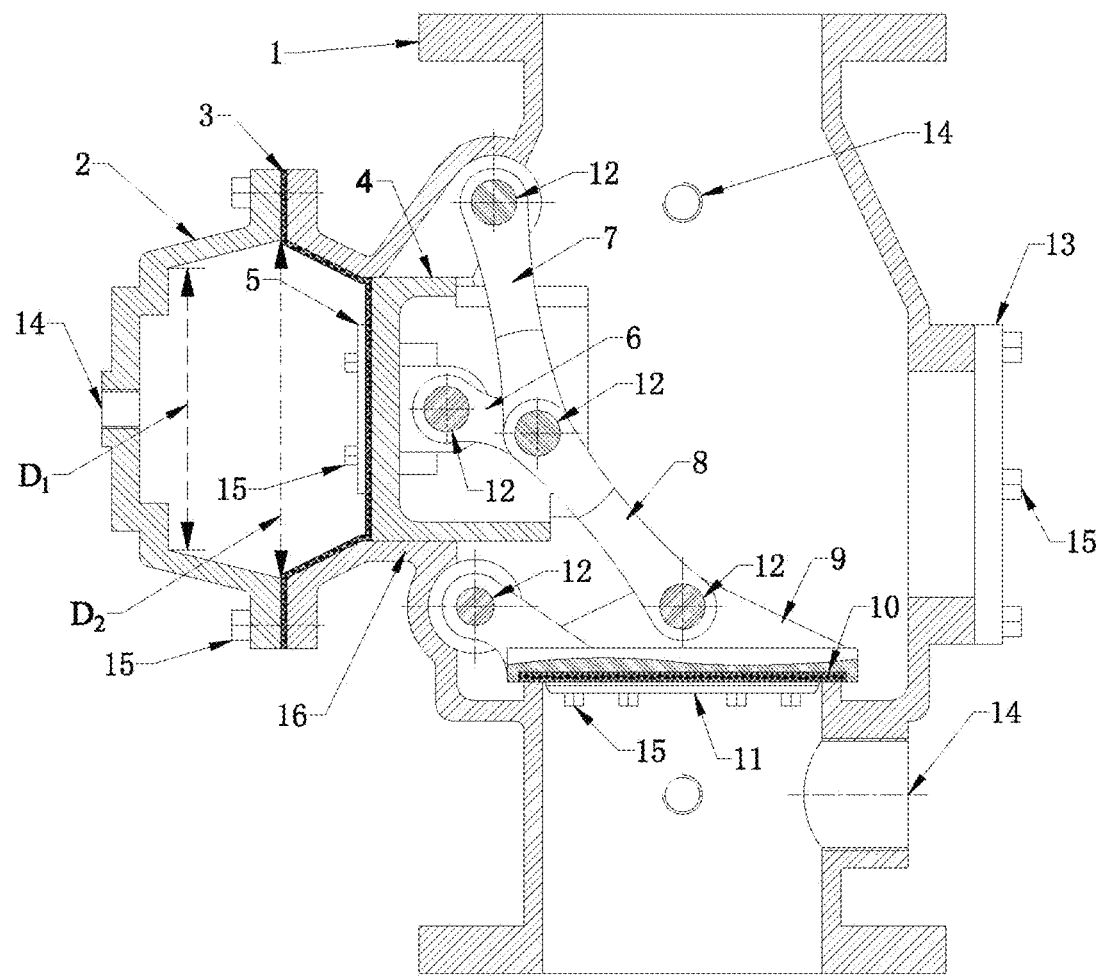
FIG. 1 is a schematic structural diagram of a main valve for drawing a straightway deluge valve when the main valve for drawing the straightway deluge valve is closed, according to the present embodiment.

LIST OF REFERENCE NUMERALS 1 valve body;
2 valve cover;

3 diaphragm;
4 drawing piston;
5 diaphragm pressure plate;
6 drawing link;
7 valve body link;
8 valve plate link;
9 valve plate;
10 sealing adhesive plate;
11 valve-plate pressure plate;
12 pin shaft;
13 mounting hole cover;
14 threaded through hole;
15 screw;
16 piston guide.

DETAILED DESCRIPTION OF THE EMBODIMENTS

Hereinafter, the technical solutions in the embodiments of the present disclosure will be described clearly and completely with reference to the accompanying drawings in the embodiments of the present disclosure. The described embodiments merely represent certain of the embodiments of the present disclosure, not all of the embodiments. Based on these embodiments of the present disclosure, all other embodiments obtained by those skilled in the art without creative efforts all belong to the scope of protection of the present disclosure.

It is an object of some embodiments to provide a main valve for drawing a straightway deluge valve used for an automatic sprinkler system with high pressure, the main valve for drawing the straightway deluge valve has low cost, long service life and convenient maintenance.

In order to enable the above objects, features and advantages of the present disclosure to be more apparent, the present disclosure will be further described in detail below with reference to the accompanying drawings and specific embodiments.

Figure 2:
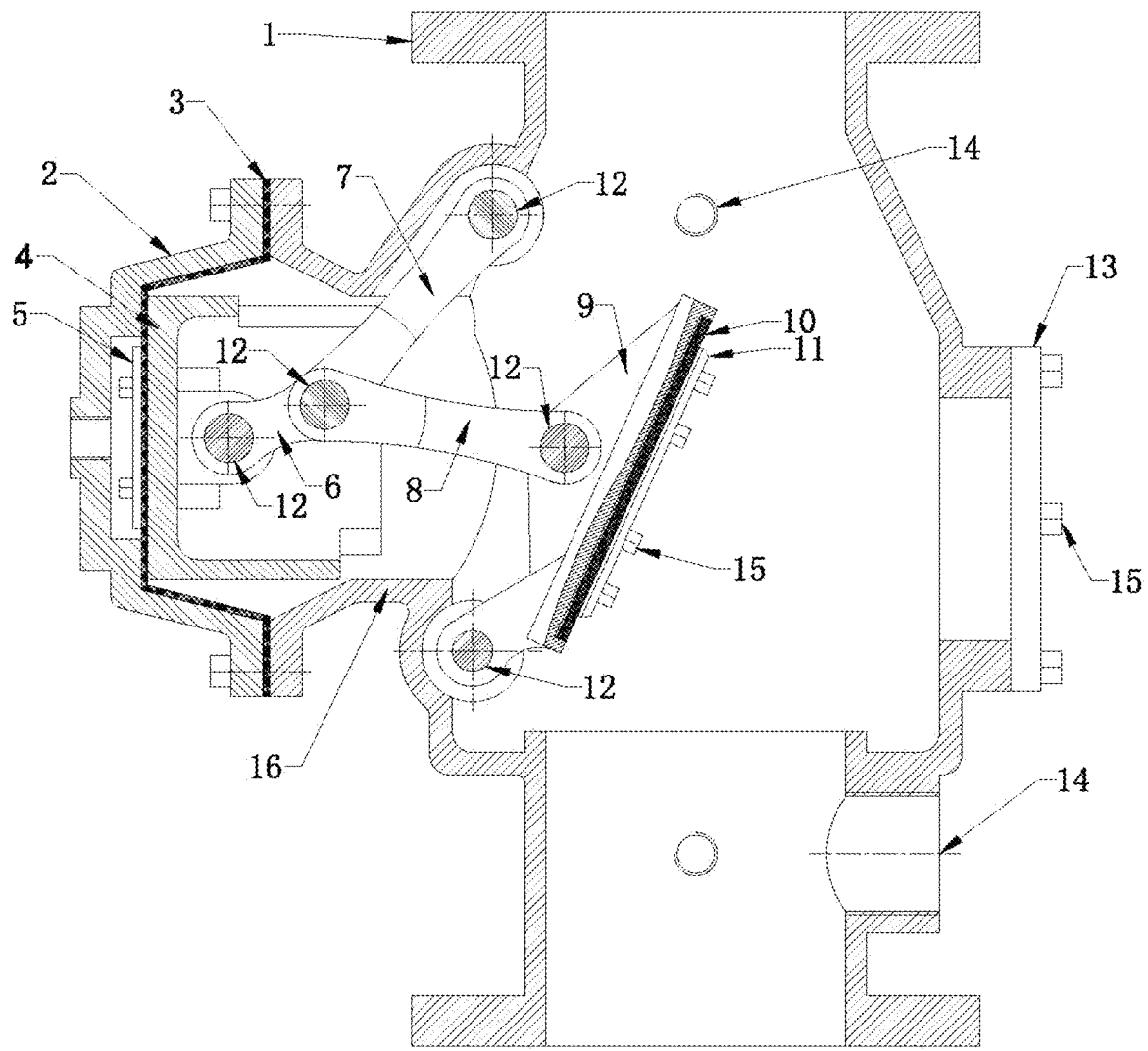
FIG. 2 is a schematic structural diagram of the main valve for drawing the straightway deluge valve when the main valve for drawing the straightway deluge valve is opened, according to the present embodiment.

As shown in FIG. 1 and FIG. 2, it is provided a main valve for drawing a straightway deluge valve, including a valve body 1, a valve cover 2, a diaphragm 3, a drawing piston 4, a diaphragm pressure plate 5, a drawing link 6, a valve body link 7, a valve plate link 8, a rotatable lip and a mounting hole cover 13.

The valve body 1 has a top communicated to a bottom thereof, to form a flow passage that can be opened and closed. The side portion of the valve body 1 is provided with a piston guide 16. The drawing piston 4 is provided slidably in the piston guide 16 along a left-right direction. The valve cover 2 is connected to the piston guide 16 through flanges. The diaphragm pressure plate 5 is connected fixedly to the drawing piston 4. A middle portion of the diaphragm 3 is clamped between the diaphragm pressure plate 5 and the drawing piston 4. An edge of the diaphragm 3 is clamped between the valve cover 2 and the piston guide 16. A control chamber is formed between the diaphragm 3 and the valve cover 2. A side wall of the valve body 1 and the valve cover 2 both are provided with threaded through holes 14 thereon. A side portion of the valve body 1 further is provided with a mounting hole. The mounting hole cover 13 is fixed sealingly to the mounting hole. A first end of the drawing link 6, a first end of the valve body link 7, and a first end of the valve plate link 8 are connected rotatably together. A second end of the drawing link 6 is connected rotatably to one side of the drawing piston 4 away from the diaphragm 3. A second end of the valve body link 7 is connected rotatably to an upper inner wall of the valve body 1. A second end of the valve plate link 8 is connected rotatably to an upper portion of the rotatable lip. One end of the rotatable lip is connected rotatably to a lower inner wall of the valve body 1. The lower portion of the valve body 1 is of a stepped structure and has an inner sealing end surface. When the drawing piston 4 slides along the piston guide 16, the rotatable lip can be brought into contact with or separated from the inner sealing end surface, thereby closing or opening the flow passage. A cavity inside the valve body 1 located above the rotatable lip is an upper cavity, and a cavity located below the rotatable lip is a lower cavity.

The working principle of the main valve for drawing the straightway deluge valve is as follows. After the liquid enters the control chamber through the threaded through hole 14 in the valve cover 2, the pressure in the control chamber gradually increases. When the increasing pressure reaches a certain value, the diaphragm 3 is pushed to drive the drawing piston 4 to move. The rotatable lip is rotated clockwise around its left end through the drawing link 6, the valve body link 7 and the valve plate link 8, such that the inner sealing end surface of the valve body 1 and the rotatable lip are brought into contact with each other and sealed. When the pressure in the control chamber is decreased to a certain value, a pressure of liquid in the lower chamber pushes the rotatable lip to rotate counterclockwise around the left end of the rotatable lip, so that the rotatable lip is separated from the inner sealing end surface of the valve body 1, and the flow passage is approximately straightway, thereby reducing flow loss.

With regard to a specific structure of the rotatable lip, a person skilled in the art may choose as desired, as long as the specific structure of the rotatable lip can contact and seal the inner sealing end surface of the valve body 1. In the present embodiment, the rotatable lip includes a valve plate 9, a sealing adhesive plate 10 and a valve plate pressure plate 11. The valve plate pressure plate 11 is connected fixedly to the valve plate 9. The sealing adhesive plate 10 is clamped between the valve plate pressure plate 11 and the valve plate 9. The valve plate 9 is connected rotatably to the lower inner wall of the valve body 1 and to the second end of the valve plate link 8. The sealing adhesive plate 10 has a good sealing property and is configured for sealing contacting with the inner sealing end surface or separating from the inner sealing end surface.

For facilitating a connection, in the present embodiment, a first connecting portion, which protrudes upwardly, is provided in the middle of the valve plate 9. One end of the valve plate 9 is provided with a second connecting portion that protrudes upwardly. The first connecting portion is connected rotatably to the second end of the valve plate link 8 via the pin shaft 12. The second connecting portion is connected rotatably to the lower inner wall of the valve body 1 through the pin shaft 12.

In order to prevent the sealing adhesive plate 10 from sliding, in the present embodiment, the lower surface of the valve plate 9 is provided with an adhesive plate recess, and the sealing adhesive plate 10 is embedded in the adhesive plate recess.

There is a plurality of rotational connection ways. In the present embodiment, the pin shaft 12 simultaneously passes through the first end of the drawing link 6, the first end of the valve body link 7 and the first end of the valve plate link 8 to achieve rotational connection among them. The second end of the drawing link 6 is connected rotatably to the one side of the drawing piston 4 away from the diaphragm 3 via the pin shaft 12. The second end of the valve body link 7 is connected rotatably to the upper inner wall of the valve body 1 via the pin shaft 12. The second end of the valve plate link 8 is connected rotatably to the upper portion of the rotatable lip via the pin shaft 12.

When the drawing piston 4 is moved in left and right direction, in order to prevent the diaphragm 3 from being damaged due to frequent friction of the diaphragm 3 with the valve cover 2 and the piston guide 16, in the present embodiment, the inner wall of the valve cover 2 is shaped to be tapered. The diameter $D_2$ of an opening of the valve cover 2 is larger than the diameter $D_1$ of a bottom of the valve cover 2. The portion of the valve body 1 opposite to the valve cover 2 also is shaped to be tapered. Therefore, the portions of the valve cover 2 and of the piston guide 16 that are connected with each other expand outwardly, for accommodating the diaphragm 3, and avoiding the diaphragm 3 from being damaged due to excessive pressing.

Furthermore, the bottom of the valve cover 2 is provided with a pressure plate recess for receiving the diaphragm pressure plate 5. The threaded through hole 14 in the valve cover 2 is located at a center position of the bottom of the pressure plate recess. The valve cover 2 and the piston guide 16 are connected fixedly through screws 15. The valve plate pressure plate 11 and the valve plate 9 are connected fixedly through screws 15. The mounting hole cover 13 and the valve body 1 are connected fixedly through screws 15.

The principle and implementation mode of the present disclosure is described through specific embodiments. The above description of the embodiment is only used to help understand the method and core concept of the present disclosure. Furthermore, for an ordinary person skilled in the art, there will be changes in the specific implementation mode and application range according to the concept of the present disclosure. Above all, the content of this specification shall not be interpreted as limitations to the present disclosure.

What is claimed is:

1. A main valve for drawing a straightway deluge valve, comprising a valve body, a valve cover, a diaphragm, a drawing piston, a diaphragm pressure plate, a drawing link, a valve body link, a valve plate link, a rotatable lip and a mounting hole cover; the valve body has a top and a bottom communicated to each other, to form a flow passage; a lower portion of the valve body is of stepped structure and has an inner sealing end surface; a piston guide is provided at a side part of the valve body; the drawing piston is slidably provided in the piston guide along a left-right direction, the valve cover is connected to the piston guide through flanges, the diaphragm pressure plate is fixedly connected to the drawing piston; a middle portion of the diaphragm is clamped between the diaphragm pressure plate and the drawing piston; an edge of the diaphragm is clamped between the valve cover and the piston guide; a side wall of the valve body and the valve cover each have a threaded through hole provided therein; a mounting hole is also provided at another side portion of the valve body; the mounting hole cover is sealingly fixed at the mounting hole; a first end of the drawing link, a first end of the valve body link and a first end of the valve plate link are rotatably connected with each other; a second end of the drawing link is rotatably connected to one side of the drawing piston away from the diaphragm; a second end of the valve body link is rotatably connected to an upper inner wall of the valve body; a second end of the valve plate link is rotatably connected to an upper portion of the rotatable lip; one end of the rotatable lip is rotatably connected to a lower inner wall of the valve body; when the drawing piston slides along the piston guide, the rotatable lip is able to in contact with or separate from the inner sealing end surface.

2. The main valve for drawing the straightway deluge valve according to claim 1, wherein the rotatable lip comprises a valve plate, a sealing adhesive plate and a valve plate pressure plate; the valve plate pressure plate is fixedly connected to the valve plate; the sealing adhesive plate is clamped between the valve plate pressure plate and the valve plate; the sealing adhesive plate is configured for sealingly contacting with or separating from the inner sealing end surface; the valve plate is rotatably connected to the lower inner wall of the valve body and the second end of the valve plate link.

3. The main valve for drawing the straightway deluge valve according to claim 2, wherein a first connecting portion which protrudes upwardly is provided in a middle of the valve plate; one end of the valve plate is provided with a second connecting portion which protrudes upwardly; the first connecting portion is rotatably connected to the second end of the valve plate link via a first pin shaft; the second connecting portion is rotatably connected to the lower inner wall of the valve body via a second pin shaft.

4. The main valve for drawing the straightway deluge valve according to claim 3, wherein a lower surface of the valve plate is provided with an adhesive plate recess; the sealing adhesive plate is embedded in the adhesive plate recess.

5. The main valve for drawing the straightway deluge valve according to claim 1, wherein a third pin shaft simultaneously passes through the first end of the drawing link, the first end of the valve body link and the first end of the valve plate link to achieve a rotational connection among them; the second end of the drawing link is rotatably connected to the one side of the drawing piston away from the diaphragm via a fourth pin shaft; the second end of the valve body link is rotatably connected to the upper inner wall of the valve body via a fifth pin shaft; the second end of the valve plate link is rotatably connected to the upper portion of the rotatable lip through a sixth pin shaft.

6. The main valve for drawing the straightway deluge valve according to claim 1, wherein the valve cover has a tapered inner wall; a diameter of an opening of the valve cover is greater than that of a bottom of the valve cover; a portion of the valve body opposite to the valve cover is also tapered.

7. The main valve for drawing the straightway deluge valve according to claim 1, wherein a bottom of the valve cover is provided with a pressure plate recess; the pressure plate recess is configured for receiving the diaphragm pressure plate.

8. The main valve for drawing the straightway deluge valve according to claim 7, wherein the threaded through hole on the valve cover is located at a center position of a bottom of the pressure plate recess.

* * * * *